*T. Hartley,*

*Meat Cutter.*

*N°. 107,364.*  *Patented Sep. 13, 1870.*

Witnesses
C. L. Evert,
J. E. Hutchinson

Inventor
Thomas Hartley,
per Alexander Mason
Attys.

United States Patent Office.

THOMAS HARTLEY, OF BRIDGEPORT, OHIO.

Letters Patent No. 107,364, dated September 13, 1870.

IMPROVED MEAT-CUTTER.

The Schedule referred to in these Letters Patent and making part of the same.

*To all whom it may concern:*

Be it known that I, THOMAS HARTLEY, of Bridgeport, in the county of Belmont and in the State of Ohio, have invented certain new and useful Improvements in Meat-Cutters; and do hereby declare that the following is a full, clear, and exact description thereof, reference being had to the accompanying drawing and to the letters of reference marked thereon, making a part of this specification.

The nature of my invention consists in eccentric revolving knives operating upon a revolving table, as will be hereinafter more fully set forth.

In order to enable others skilled in the art to which my invention appertains to make and use the same, I will now proceed to describe its construction and operation, referring to the annexed drawing, in which—

Figure 1:
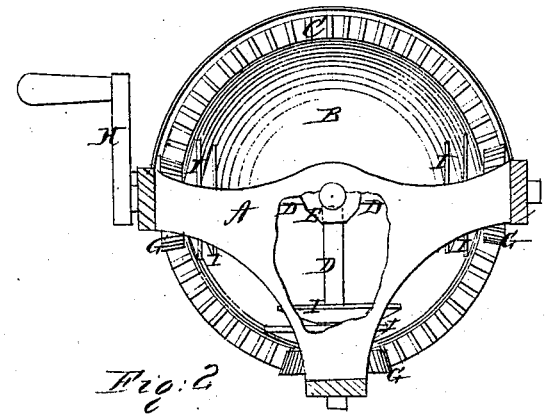

Figure 1 is a plan view, and

Figure 2:
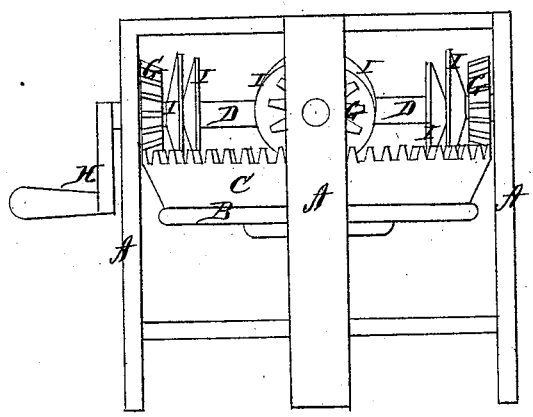

Figure 2, a side elevation of my improved meat-cutter.

In all sausage-machines with which I am acquainted, the knives work square upon a block, or the meat pressed through a cylinder. The first is objectionable in not making a clean cut, being very difficult to cut the sinews. The second, acting by pressure, breaks the grain of the meat.

My machine obviates those difficulties by the knives being eccentric, and revolving, on a shaft, over a rotary table, thereby causing the knives to make a draw-cut without pressing upon the grain of the meat.

A represents the frame-work of my machine, in which, upon a vertical shaft, is placed a horizontal circular table, B, provided around its edge with a cogged upward-projecting rim, C.

In the frame A are placed three horizontal shafts, D D, which have their inner bearings in a center-block, E, while their outer bearings are in the frame.

On each of the shafts D is a cog-wheel, G, gearing with the cogged rim C; and one of said shafts has, at its outer end, a crank, H, by means of which the table and all the shafts are revolved.

On each shaft is placed a series of eccentric-knives, I I, a suitable distance apart. These knives will cut very rapidly, and, being eccentric, will give the meat a draw-cut.

Having thus fully described my invention,

What I claim as new, and desire to secure by Letters Patent, is—

The combination of the table B with cogged rim C, pinions G G, shafts D D, and knives I I, all constructed and arranged as described, to operate substantially as and for the purposes herein set forth.

In testimony that I claim the foregoing, I have hereunto set my hand this 21st day of July, 1870.

THOMAS HARTLEY.

Witnesses:
T. C. ROWLES,
J. B. ROWLES.